United States Patent
Yoshikawa et al.

(10) Patent No.: US 11,940,750 B2
(45) Date of Patent: Mar. 26, 2024

(54) PAPER PHYSICAL PROPERTY DETECTING DEVICE, IMAGE FORMING APPARATUS, PAPER PHYSICAL PROPERTY DETECTING METHOD, AND COMPUTER READABLE RECORDING MEDIUM STORING CONTROL PROGRAM

(71) Applicant: Konica Minolta, Inc., Tokyo (JP)

(72) Inventors: Hiroyuki Yoshikawa, Toyohashi (JP);
Hitoshi Asano, Toyokawa (JP);
Yumiko Izumiya, Hachioji (JP);
Yasuhiro Koide, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/968,455

(22) Filed: Oct. 18, 2022

(65) Prior Publication Data
US 2023/0176515 A1    Jun. 8, 2023

(30) Foreign Application Priority Data

Dec. 7, 2021    (JP) ................... 2021-198284

(51) Int. Cl.
*G03G 15/00* (2006.01)
*B65H 43/00* (2006.01)
(Continued)

(52) U.S. Cl.
CPC ......... *G03G 15/5029* (2013.01); *B65H 43/00* (2013.01); *G01N 3/06* (2013.01); *G01N 3/20* (2013.01); *G01N 21/3554* (2013.01); *G01N 21/359* (2013.01); *G01N 21/86* (2013.01); *G01N 27/04* (2013.01); *G03G 15/6529* (2013.01);
(Continued)

(58) Field of Classification Search
CPC .......... G03G 15/5029; G03G 15/6529; G03G 2215/00738; G03G 2215/00763; G03G 2215/00767; G03G 2215/00776; B65H 7/02; B65H 43/00; B65H 2515/70; B65H 2515/805; B65H 2515/81; B65H 2553/40; G01N 3/06; G01N 3/20; G01N 21/3554; G01N 21/359; G01N 21/86; G01N 27/04; G01N 2203/0023; G01N 2203/06
See application file for complete search history.

(56) References Cited

U.S. PATENT DOCUMENTS 8,045,868 B2 * 10/2011 Kuramochi .............. B65H 7/02
399/45
2021/0078813 A1 * 3/2021 Izumiya ................... B65H 7/02
(Continued)

FOREIGN PATENT DOCUMENTS

JP    2009-069456 A    4/2009

*Primary Examiner* — Sophia S Chen
(74) *Attorney, Agent, or Firm* — BakerHostetler

(57) ABSTRACT

Paper physical property detecting device includes a first detector that measures a sheet of paper (hereinafter, merely referred to as a paper) made to stop temporarily on a conveyance path and acquires a first value corresponding to a first physical property, a second detector that measures a paper while conveying the paper on the conveyance path and acquires a second value corresponding to a second physical property with regard to a physical property different from the first physical property; and a corrector that corrects the first value on a basis of the second value and creates post correction data.

24 Claims, 10 Drawing Sheets

(51) Int. Cl.
*G01B 11/30* (2006.01)
*G01N 3/06* (2006.01)
*G01N 3/20* (2006.01)
*G01N 21/27* (2006.01)
*G01N 21/3554* (2014.01)
*G01N 21/359* (2014.01)
*G01N 21/86* (2006.01)
*G01N 27/04* (2006.01)

(52) U.S. Cl.
CPC .... *B65H 2515/70* (2013.01); *B65H 2515/805* (2013.01); *B65H 2515/81* (2013.01); *B65H 2553/40* (2013.01); *G01N 2203/0023* (2013.01); *G01N 2203/06* (2013.01)

(56) References Cited

U.S. PATENT DOCUMENTS

| | | | |
|---|---|---|---|
| 2021/0078816 A1* | 3/2021 | Izumiya | G01B 11/06 |
| 2021/0354941 A1* | 11/2021 | Yoshimura | B65H 7/02 |
| 2022/0176715 A1* | 6/2022 | Yoshimura | G03G 15/5029 |
| 2022/0191340 A1* | 6/2022 | Seki | H04N 1/00708 |
| 2023/0009567 A1* | 1/2023 | Ishihara | B65H 7/02 |

* cited by examiner

FIG.10
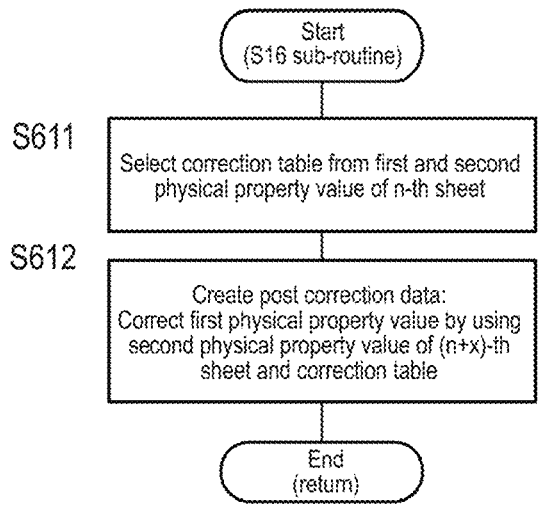
FIG.11A
| Second physical property | First physical property | |
|---|---|---|
| Moisture content | Stiffness [ Nm ] | |
| 0.145 or less | 240 | (n+x2)-th sheet |
| 0.146 ~ 0.169 | 235 | (n+x1)-th sheet |
| 0.17 or more | 201 | First sheet |
- Detection result of n-th sheet (first sheet)
FIG.11B
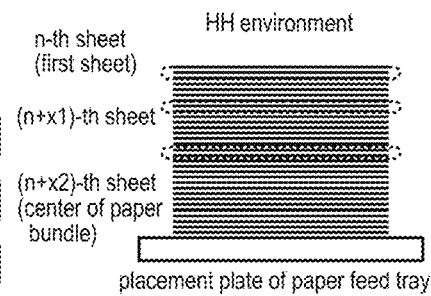
FIG.12
| Second physical property | First physical property | |
|---|---|---|
| Moisture content | Stiffness [ Nm ] | |
| 0.145 or less | 189 | (n+x2)-th sheet |
| 0.146 ~ 0.169 | 182 | (n+x1)-th sheet |
| 0.17 or more | 168 | First sheet |
- Detection result of n-th sheet (first sheet)

FIG.13

| Second physical property | First physical property | |
|---|---|---|
| Moisture content | Paper resistance [ MΩ ] | |
| 0.145 or less | 3064 | (n+x2)-th sheet |
| 0.146 ~ 0.169 | 489 | (n+x1)-th sheet |
| 0.17 or more | 3 | First sheet |

Detection result of n-th sheet (first sheet)

FIG.14

| Second physical property | First physical property | |
|---|---|---|
| Moisture content | Paper resistance [ MΩ ] | |
| 0.145 or less | 2827 | (n+x2)-th sheet |
| 0.146 ~ 0.169 | 442 | (n+x1)-th sheet |
| 0.17 or more | 3 | First sheet |

Detection result of n-th sheet (first sheet)

FIG.15

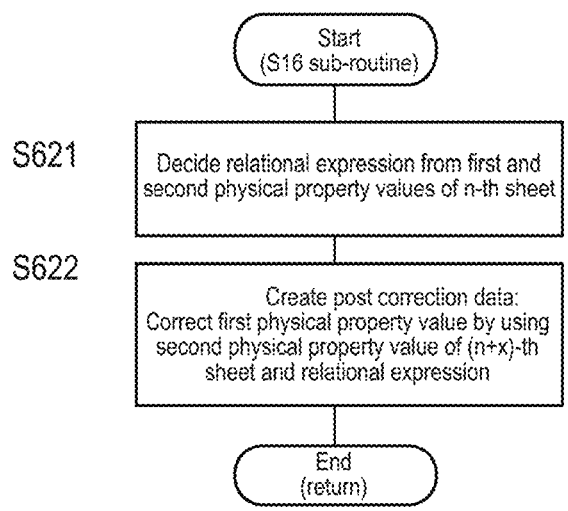

| Second physical property | First physical property |
|---|---|
| Moisture content | Stiffness [ Nm ] |
| 0.14 | 249 |
| 0.145 | 241 |
| 0.15 | 233 |
| 0.155 | 225 |
| 0.16 | 217 |
| 0.165 | 209 |
| 0.17 | 201 |
| 0.175 | 193 |
| 0.18 | 185 |
| 0.185 | 177 |
| 0.19 | 169 |
| 0.195 | 161 |
| 0.2 | 153 |

|  | Second physical property | | First physical property |
|---|---|---|---|
|  | Moisture content | Rate of change | Stiffness [ Nm ] |
| First sheet | 0.17 | 0% | 199 |
| (n+x)-th sheet | 0.145 | -14.7% | 228.3 |

PAPER PHYSICAL PROPERTY DETECTING DEVICE, IMAGE FORMING APPARATUS, PAPER PHYSICAL PROPERTY DETECTING METHOD, AND COMPUTER READABLE RECORDING MEDIUM STORING CONTROL PROGRAM

CROSS-REFERENCE TO RELATED APPLICATION

This application claims priority to Japanese Patent Application No. 2021-198284, filed on Dec. 7, 2021, the entire disclosure of which is incorporated herein by reference.

BACKGROUND

Technological Field

The present invention relates to a paper physical property detecting device, an image forming apparatus, a paper physical property detecting method, and a computer readable recording medium storing a control program.

Description of the Related Arts

In recent years, in color printing industries, image forming apparatuses, such as a printer of an electrophotographic type, have been utilized widely. In the field of PP (production print) corresponding to the color printing industries, the image forming apparatuses are requested to have adaptation to a sheet of paper (hereinafter, merely referred as a paper) of each of various types as compared with the case of being used in offices. Furthermore, in order to perform printing with high quality for a paper of each of various types, some image forming apparatuses are configured to set physical properties of a paper stored in a paper feed tray with multiple items and to perform printing with an image forming condition corresponding to the set items.

Moreover, in order to perform setting for a paper of each of such various types, some image forming apparatuses include a sensor that automatically detects the characteristics of a paper to be used for printing. For example, in image forming apparatuses configured to transfer a toner image onto a paper with a transfer roller, Patent Literature 1 (Japanese Unexamined Patent Publication No. 2009-069456) discloses an image forming apparatus that includes a stiffness detector to measure the stiffness of a paper and is configured to control a separation bias current to a separation bias applicator disposed on a downstream side of the transfer roller correspondingly to the stiffness measured by the stiffness detector. In this connection, when having made a paper stop temporarily on an upstream side of a registration roller, the paper gets warped. Then, the stiffness detector is configured to measure the stiffness of the paper by measuring an amount of warp of the warped paper.

SUMMARY

However, paper physical properties of a paper, such as stiffness, may differ even in a case of using the same paper type. For example, even in a case of a paper bundle stored in one paper feed cassette, depending on a state in the paper bundle, between a paper in the uppermost surface of the paper bundle and a paper in the middle of the paper bundle other than the paper in the uppermost surface, paper physical properties may differ for a paper of each sheet. Due to such reasons, it is preferable to detect paper physical properties for a paper of each sheet. However, if paper physical properties are detected by making a paper of each of all sheets stop temporarily, paper conveyance may be made to delay, and productivity with regard to paper conveyance may be made to lower remarkably.

The present invention has been achieved in view of the above-described circumstances, and an object of the present invention is to perform detection of paper physical properties with high precision and to provide a paper physical property detecting device that suppresses lowering of the productivity.

In order to realize the above-described object, a paper physical property detecting device, which reflects one aspect of the present invention, includes: conveyance path on which a sheet of paper (hereinafter, merely referred to as a paper) fed from a paper feed tray is conveyed; a first detector that measures a paper made to stop temporarily on the conveyance path and acquires a first value corresponding to a first physical property; a second detector that measures a paper while conveying the paper on the conveyance path and acquires a second value corresponding to a second physical property with regard to a physical property different from the first physical property; and a corrector that corrects the first value on a basis of the second value and creates post correction data.

Furthermore, in order to realize the above-described object, a paper physical property detecting method, which reflects one aspect of the present invention, to be executed in a paper physical property detecting device that includes a conveyance path on which a sheet of paper (hereinafter, merely referred to as a paper) fed from a paper feed tray is conveyed, a first detector that measures a paper made to stop temporarily on the conveyance path and acquires a first value corresponding to a first physical property, and a second detector that measures a paper while conveying the paper on the conveyance path and acquires a second value corresponding to a second physical property with regard to a physical property different from the first physical property, the method includes: (a) acquiring the second value by the second detector for a paper conveyed on the conveyance path; and (b) creating post correction data by correcting the first value on a basis of the second value.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 10 is a subroutine flowchart showing processing in Step S16.

FIGS. 11A and 11B are illustrations for describing a selected correction table and a change of each of the first and second physical property values.

FIG. 12 is an illustration for describing a correction table selected in another paper (basis weight) and a change of each of the first and second physical property values.

FIG. 13 is an illustration for describing a correction table in the case where the first physical property is paper resistance and a change of each of the first and second physical property values.

FIG. 14 is an illustration for describing a correction table selected in another paper (basis weight) and a change of each of the first and second physical property values.

FIG. 15 is a subroutine flowchart showing processing in Step S16 in the first modified example.

DETAILED DESCRIPTION OF EMBODIMENTS

Figure 1:
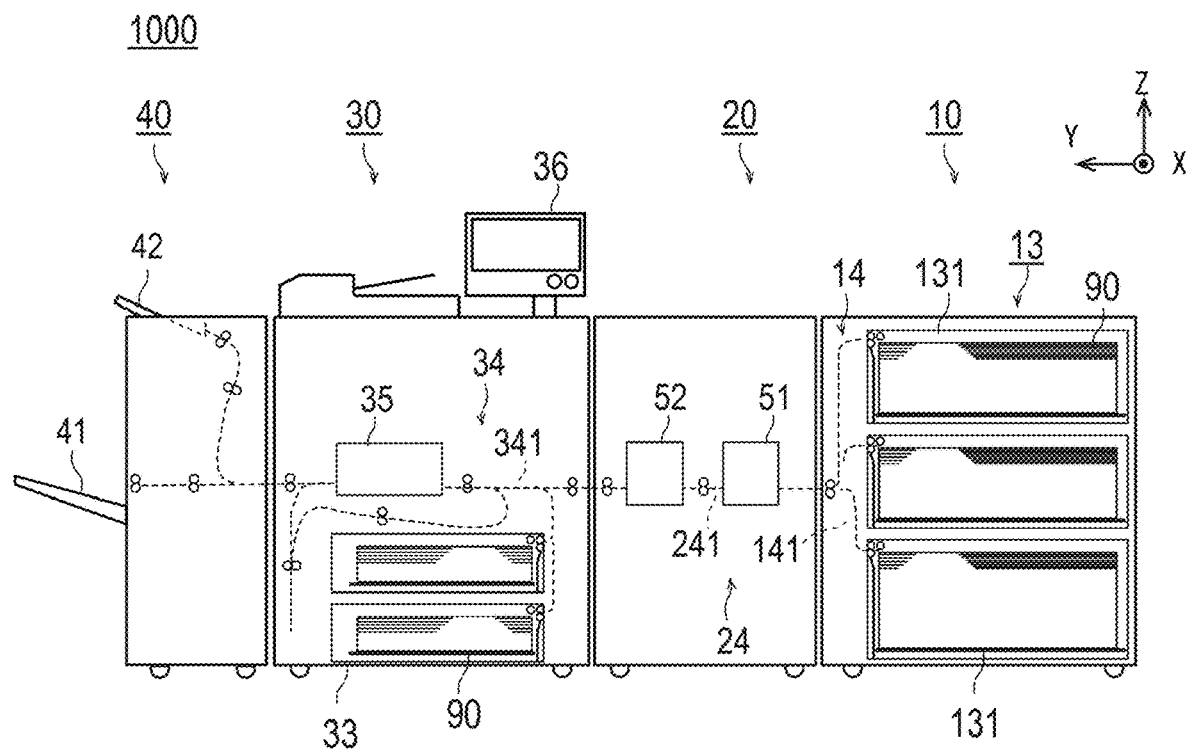
FIG. 1 is a drawing showing a schematic configuration of an image forming apparatus including a paper physical property detecting device according to the present embodiment.

Hereinafter, an embodiment of the present invention will be described with reference to the attached drawings. However, the scope of the invention is not limited to the disclosed embodiments. In this connection, in the descriptions of the drawings, the same reference numerals are given to the respective same components, and overlapping descriptions are omitted. Moreover, the dimensional ratios in the drawings are exaggerated on account of description and may differ from the respective actual ratios. In the drawings, the vertical direction is made the Z direction, the front to rear direction of the image forming apparatus is made the X direction, and the direction orthogonal to these X and Z directions is made the Y direction. The X direction is also called the width direction or the rotation axis direction, and the Y direction is also called the conveyance direction. In the present embodiment, a sheet of paper (hereinafter, merely referred to as a paper) includes a printing paper (hereinafter, merely referred to as a paper) and a film of one of various kinds. In particular, the paper includes those manufactured by using mechanical pulp derived from plant and/or chemical pulp. Moreover, the types of the paper include a glossy paper and a matte paper of a coated paper and a regular paper and a high-quality paper of a non-coated paper.

Figure 2:
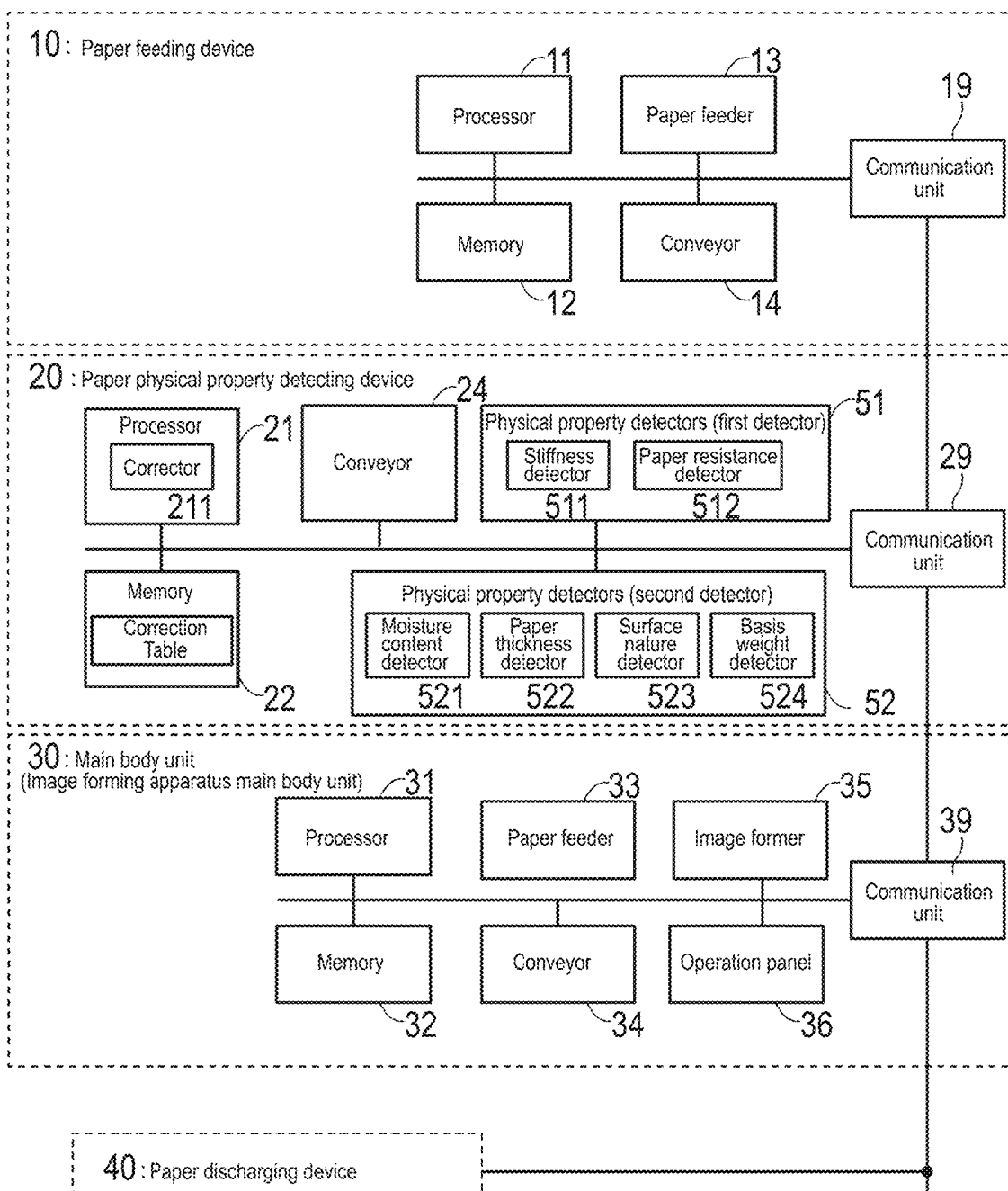
FIG. 2 is a block diagram of the image forming apparatus.

FIG. 1 is a drawing showing a schematic configuration of an image forming apparatus 1000 including a paper physical property detecting device 20 according to the present embodiment. FIG. 2 is a block diagram showing a hardware configuration of the image forming apparatus 1000. As shown in FIG. 1, the image forming apparatus 1000 includes a paper feeding device 10, a paper physical property detecting device 20, an image forming apparatus main body unit 30 (hereinafter, merely referred to as a main body unit 30), and a paper discharging device 40, which are mechanically and electrically connected to each other.

(Paper Feeding Device 10)

The paper feeding device 10 includes a processor 11, a memory unit 12, a paper feeder 13, a conveyor 14, and a communication unit 19. These components are mutually connected to each other through signal lines, such as a bus for exchanging signals.

The processor 11 includes a CPU and a memory. The CPU is a control circuit including multi core processors and the like configured to control each of the above units and to execute various kinds of arithmetic processing in accordance with programs. Each function of the paper feeding device 10 is exhibited such that the CPU executes a program corresponding to it. The memory is a high-speed accessible main memory device that memorizes a program and data temporarily as a working region. As the memory, for example, DRAM, SDRAM, SRAM, etc. are adopted.

The memory unit 12 is a large-capacity auxiliary memory device that stores various programs including an operating system and various data. As a storage, for example, a hard disk, a solid-state drive, a flash memory, ROM, etc. are adopted.

The paper feeder 13 includes a plurality of paper feed trays 131, feeds a paper 90 stored in each of the paper feed trays 131 one sheet by one sheet and is configured to send the paper 90 out to the conveyance path of the conveyor 14.

The conveyor 14 includes a conveyance path 141 on which a plurality of conveyance rollers is disposed and is configured to convey a paper 90 fed from each of the paper feed trays 131 and to send them out to the paper physical property detecting device 20 on the downstream side.

The communication unit 19 is an interface for communicating with other devices.

(Paper Physical Property Detecting Device 20)

The paper physical property detecting device 20 includes a processor 21, a memory unit 22, a conveyor 24, physical property detectors 51 and 52, and a communication unit 29. The physical property detectors 51 and 52 function as the first and second detectors, respectively and detect the first and second values corresponding to the first and second physical properties, respectively. In the following, the physical property detectors 51 and 52 are also referred to as a first physical property detector 51 and a second physical property detector 52. The first and second values may be, as values corresponding to physical properties, respective physical property values themselves or values indicating the concerned physical properties, such as current and voltage of sensors corresponding to the physical property values. In this connection, in the example below, the first and second values are described as those showing the respective physical property values.

The processor 21 includes, similarly to the above-mentioned processor 11, a CPU and a memory. The processor 21 functions as a corrector 211 and performs correction for the first and second physical property values (or the first and second values, hereinafter, the same is applicable) acquired by the physical property detectors 51 and 52. The correction function will be described later. Moreover, the processor 21 includes a control chip on its control base board and is configured to control the action of each of component members, such as a motor of each of the physical property detectors 51 and 52 (refer to below-mentioned FIG. 6).

The memory unit 22 memorizes a correction table (or a relational expression) that is used in correction control in the corrector 211 and indicates a correspondence relation between the first and second physical property values.

The conveyor 24 includes a conveyance path 241, and on this conveyance path 241, the first and second physical property detectors 51 and 52 are disposed. Each of the first and second physical property detectors 51 and 52 includes one or more sensors and is configured to detect one or more paper physical property values with regard to paper physical properties different from each other. The conveyor 24 conveys a paper 90 sent from the paper feeding device 10 and conveys it to the main body unit 30 on the downstream side. The details of the physical property detectors 51 and 52 will be mentioned later. The communication unit 29 is an interface for communicating with other devices. This communication unit 29 functions as an output unit by cooperating with the processor 21 and outputs post correction data mentioned later to the main body unit 30.

(Main Body Unit 30)

The main body unit 30 is also referred as an image forming apparatus main body and performs image formation to a paper 90 sent from the paper physical property detecting device 20 on the upstream side. The main body unit 30 includes a processor 31, a memory unit 32, a paper feeder 33, a conveyor 34, an image former 35, an operation panel 36, and a communication unit 39.

The processor 31 includes, similarly to the above-mentioned processors 11 and 21, a CPU and a memory. The processor 31 functions as a control unit of the image forming apparatus 1000 by cooperating with the processors 11 and 21 and the like of other devices and controls the entire image forming apparatus 1000. Moreover, the processor 31 performs setting of control parameters at the time of image formation by any one of the first and second techniques described below on the basis of the paper physical properties (the first and second paper physical properties) sent from the output unit of the paper physical property detecting device 20 and/or the paper physical properties input through the operation panel 36.

(First Technique)

The processor 31 of the main body unit 30 performs discrimination processing on the basis of a plurality of paper physical properties including the first and second paper physical properties and discriminates a paper type (type of a paper) and a basis weight. In this discrimination processing, the paper type and the basis weight are discriminated as one of a plurality of segmented paper types and one of a plurality of segmented basis weights. Then, on the basis of the discriminated paper type and basis weight, the processor 31 performs decision processing for control parameters of an image forming condition. At the time of performing this decision processing for parameters, the processor 31 refers to a correspondence table that is memorized in advance in the memory unit 32 and describes a control value of each parameter in fixation, transfer, and conveyance for each combination of paper type and basis weight.

(Second Technique)

In the second technique, the processor 31 decides each control parameter directly from paper physical properties. For example, the processor 31 decides each control parameter from a plurality of paper physical properties among a plurality of paper physical properties 1 to n including the first and second paper physical properties. For example, a fixation control parameter is decided from paper physical properties 2 and 4, a transfer control parameter is decided from paper physical properties 1, 3, and n, and a conveyance control parameter is decided from paper physical properties 1 and n. In this connection, at the time of deciding control parameters, trained model having been subjected to learning with machine learning may be used.

The memory unit 32 memorizes the above-mentioned correspondence table or the machine trained model that is used for setting of control parameters on the basis of the paper physical properties. The paper feeder 33 and the conveyor 34 have respective functions equivalent to the above-mentioned paper feeder 13 and conveyor 14 and are configured to feed the paper 90 stored in the paper feed tray of the paper feeder 33 and to convey the paper 90 on the conveyance path 341.

The image former 35 forms images, for example, with an electrophotographic method. The image former 35 includes a writer, a photoconductor drum, a developing unit that stores a two-component developer composed of toner and carrier, and the like (neither is shown in the drawings). Each of the writer, the photoconductor drum, and the developing unit is provided multiple pieces so as to correspond to each of basic colors of Y (yellow), M (magenta), C (cyan), and K (black). The image former 35 further includes an intermediate transfer belt, a secondary transferer, and a fixing unit. Toner images formed on the respective photoconductor drums by the respective developing units of multiple colors are superimposed on each other on the intermediate transfer belt and are transferred to a paper 90 having been conveyed on the conveyance path 341 in the secondary transferer (hereinafter, also referred to as a transfer process). The toner images on the paper 90 are fixed onto the paper 90 in the fixing unit on the downstream side by being heated and pressed (hereinafter, also referred to as a fixing process). Control parameters on an image forming condition for these transfer process, fixing process, and conveyance process are set by one of the first and second techniques as mentioned above on the basis of the paper physical properties by the processor 31.

The operation panel 36 includes a touch panel, a ten key, a start button, a stop button, and the like and is configured to display a state of the main body unit 30 or the image forming apparatus 1000. Moreover, the operation panel 36 is used by a user for inputting and setting paper physical properties such as a type of a paper placed in the paper feed tray and for inputting an instruction.

The communication unit 39 is an interface for communicating with other devices, such as the paper feeding device 10, the paper physical property detecting device 20 and the like. Moreover, the communication unit 39 is also an interface that connects with external devices via networks.

(Paper Discharging Device 40)

The paper discharging device 40 discharges a paper sent from the main body unit 30. The paper discharging device 40 includes paper discharging trays 41 and 42. For example, the paper discharging tray 42 is used for discharging a paper of the first sheet (blank paper, discard paper) for which the measurement of both the later mentioned first and second physical property values is performed, and the paper discharging tray 41 is used for discharging a paper of each of the second and subsequent sheets for which actual printing is performed, that is, for which only the measurement of the second physical property value is performed without accompanying temporary stop in paper conveyance. In this connection, the present embodiment shows an example in which the paper discharging device 40 is connected to the main body unit 30. However, in place of this configuration, or alternatively, between the paper discharging device 40 and the main body unit 30, a post processing device may be used so as to perform at least one post processing of stapling processing, punching processing, cutting processing, bending processing, and bookbinding processing relative to a paper 90 on which an image is formed.

(Physical Property Detectors 51 and 52)

With reference to from FIG. 3 to FIG. 6, together with FIG. 2, the physical property detectors 51 and 52 are described.

(First Physical Property Detector 51 (First Detector))

As shown in FIG. 2, the physical property detector 51 includes a stiffness detector 511 and a paper resistance detector 512. The stiffness detector 511 and the paper resistance detector 512 measure the stiffness and paper resistance (means electric resistance (volume) of a paper, hereinafter, the same is applicable) of a paper, respectively, as the first physical property in a state where a paper 90 is made to stop temporarily.

(Stiffness Detector 511)

Figure 3A:
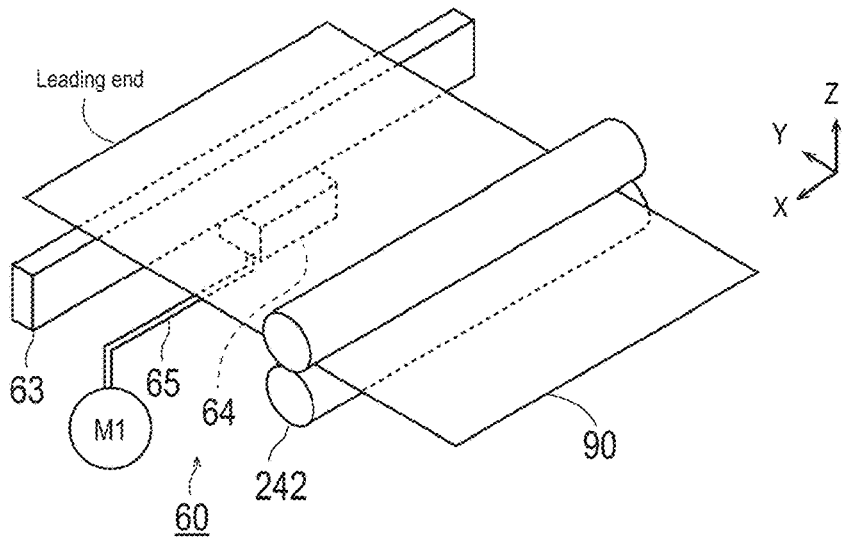
FIGS. 3A and 3B are schematic drawings showing a configuration of a stiffness detector included in a physical property detector (a first detector).
Figure 3B:
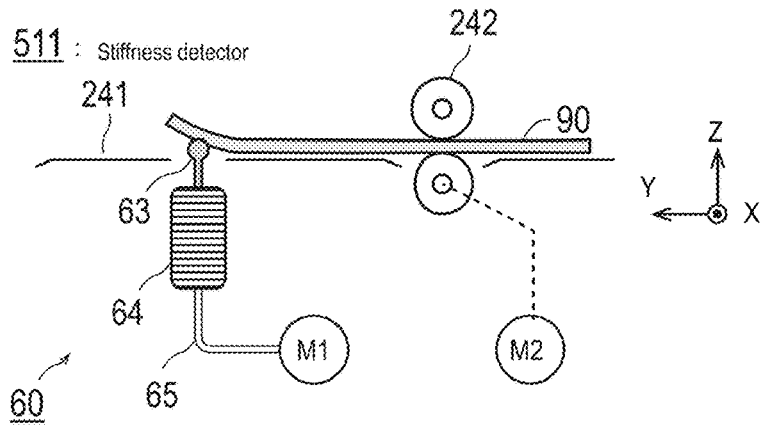

FIGS. 3A and 3B are schematic drawings showing a configuration of a stiffness detector 511, in which FIG. 3A is a perspective view and FIG. 3B is a side view. The stiffness detector 511 detects the stiffness of a paper 90 having been conveyed on the conveyance path 241. The stiffness detector 511 includes conveyance rollers 242 to hold one end portion side of the paper 90 and a pressing unit 60. In the example shown in FIG. 3, the conveyance rollers 242 are included also in the conveyor 24 and serve additionally as a function to convey the paper 90. However, a separate member may be applied for this function.

The pressing unit 60 includes a pushing-up member 63 that pushes up a paper 90, a pressing force detector 64 that detects a pressing force, a supporting mechanism 65 that supports the pushing-up member 63 so as to be movable in the Z direction, and a motor M1 that moves the pushing-up member 63 in the Z direction via the supporting mechanism 65. The pushing-up member 63 is a long-sized member longer in the paper width direction X. The pushing-up member 63 is formed in a long-sized plate shape so as to be able to come in contact with the entire width of a paper 90 to be conveyed in the paper conveyance direction Y. The pressing force detector 64 detects a pressing force when pushing up a paper 90 by the pushing-up member 63 so as to bend the paper 90 by the pushing-up member 63 and is configured by, for example, a pressure sensor. The supporting mechanism 65 supports the pushing-up member 63 and the pressing force detector 64 so as to be movable in the Z direction. The motor M1 is a driving source for moving the pushing-up member 63 and the pressing force detector 64 in the Z direction and is configured by, for example, a stepping motor.

When measuring a stiffness, a paper 90 is made to stop temporarily at a predetermined position on the conveyance path 241 by making the motor M2 of the conveyance rollers 242 stop, and. At this time, the leading end of the paper 90 is located at a position slightly exceeding the pushing-up member 63. The leading end position of the paper 90 can be determined on the basis of a passing timing of the leading end having passed over at a paper existence/nonexistence detection sensor (not shown) disposed on the conveyance path 241 and a feeding distance (amount of rotation) of the conveyance rollers 242 since the leading end has passed over.

Next, the pressing unit 60 causes the pushing-up member 63 to move upward by the drive of the motor M1. With this, a free end (leading end) of the paper 90 is bent by being pushed up as shown in FIG. 3B by the pushing-up member 63. At this time, a position where the pushing-up member 63 starts to come in contact with the paper surface of the paper 90 in a state where the paper 90 does not bend, is made a home position of the pushing-up member 63 in the Z direction. Then, a pressing force received from the paper 90 when the paper 90 is bent from the home position by a predetermine amount (for example, 3 mm) by the pushing-up member 63, is detected by the pressing force detector 64. The pressing unit 60 presses the paper 90 by pushing the pushing-up member 63 against the paper 90 at a position distant by a second distance shorter than a first distance (distance from the leading end of the paper to the rollers 242) from the leading end of the paper 90. It is possible to grasp an amount of pushing-up of the paper 90 by the pushing-up member 63 on the basis of the number of pulse signals having input into a driver of the motor M1. Thus, the stiffness detector 511 measures the stiffness of the paper 90 on the basis of a pressing force at the time of having bent the paper 90. That is, the stiffness detector 511 acquires a pressing force detected by the pressing force detector 64 at the time of having bent the paper 90 by the pushing-up member 63, as the stiffness of the paper 90. The stiffness of the paper 90 obtained in this way is the stiffness of the paper 90 in the paper conveying direction Y. In this connection, in FIGS. 3A and 3B, the description has been given on the basis of an example of a case where both a region to be pressed by the holding member (rollers 242) and a region to be pushed up by the pushing-up member 63 are parallel to the width direction X. However, in addition, the holding member and the pushing-up member 63 are arranged to incline by a predetermined angle (for example, 45 degrees) relative to the width direction X, and then the stiffness is also measured at this predetermined angle, whereby the stiffness may be made so as to be calculated not only in the width direction but also in the longitudinal direction (conveyance direction).

(Paper Resistance Detector 512)

Figure 4:
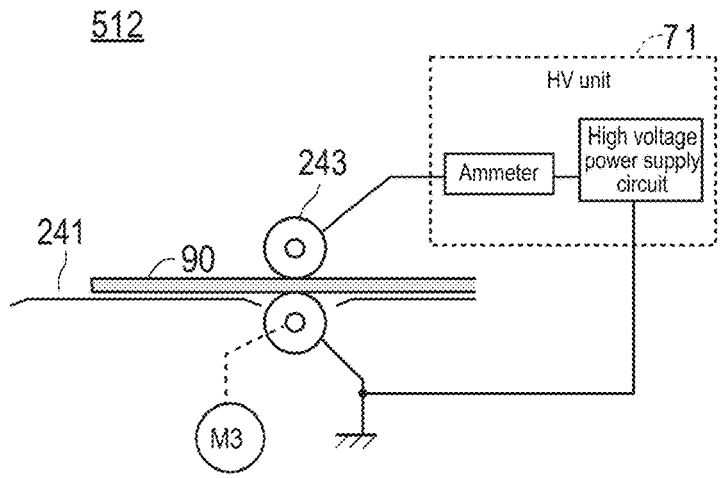
FIG. 4 is a schematic drawing showing a configuration of a paper resistance detector included in the physical property detector (the first detector).

FIG. 4 is a schematic drawing showing a configuration of the paper resistance detector 512. The paper resistance detector 512 detects the electric resistance (volume electrical resistance) of a paper 90 having been conveyed on the conveyance path 241. The paper resistance detector 512 includes conveyance rollers 243 that sandwiches the paper 90 with a pair of rollers and an HV (high voltage) unit 71. In the example shown in FIG. 4, the conveyance rollers 243 are included also in the conveyor 24 and serve additionally as a function to convey the paper 90. However, a separate member may be applied for this function. However, a separate member may be applied for this function. Moreover, these conveyance rollers 243 may be the same rollers as the conveyance rollers 242 shown in FIG. 3.

At the time of measuring electric resistance, the drive motor M3 of the conveyance rollers 243 is made to stop at a predetermined position on the conveyance path 241, and the paper 90 is made to stop temporarily. In this state, a high voltage is applied to the upper roller (also called a detection roller) of the conveyance rollers 243 by the HV unit 71, and then, the current value of an electric current flowing to the lower roller (opposing roller) grounded via the paper 90 is measured.

(Second Physical Property Detector 52 (Second Detector))

As shown in FIG. 2, the physical property detector 52 includes a moisture content detector 521, a paper thickness detector 522, a surface nature detector 523, and a basis weight detector 524. The moisture content detector 521, the paper thickness detector 522, the surface nature detector 523, and the basis weight detector 524 measure the moisture content, paper thickness, surface nature, and basis weight of a paper as the second physical properties, respectively, while making the paper 90 to be conveyed without making it stop temporarily.

(Moisture Content Detector 521)

Figure 5:
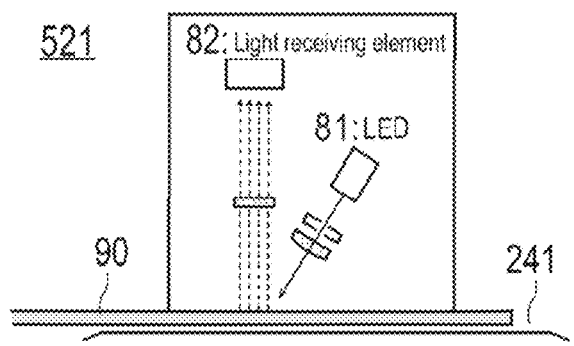
FIG. 5 is a schematic drawing showing a configuration of a moisture content detector included in a physical property detector (a second detector).

FIG. 5 is a schematic drawing showing a configuration of the moisture content detector 521. The moisture content detector 521 measures the moisture content (physical property value with regard to a moisture amount, and referred to as moisture content) of a paper 90 having been conveyed on the conveyance path 241 with an optical sensor. The moisture content detector 521 includes optical elements, such as an LED (light emitting element) 81, a light receiving element 82, a lens, an aperture, and a collimating lens. The moisture content detector 521 irradiates light with a predetermined wavelength in a near-infrared region from the LED 81 to the paper 90 and detects the reflected light with the light receiving element 82. The moisture content detector 521 detects the moisture content of a paper by utilizing a nature in which the absorption percentage of light with a predetermined wavelength in a near-infrared region changes correspondingly to the moisture content of the paper 90.

(Paper Thickness Detector 522)

The paper thickness detector 522 includes paired conveyance rollers in which at least one of them is movable correspondingly to the thickness of the paper 90 that passes through the nip of the rollers and a measuring unit that measures a distance between respective axes of the paired conveyance rollers. This measuring unit is configured by, for example, an actuator, an encoder, and light emitting and light receiving units. The axis position of the movable follower roller is displaced correspondingly to the thickness of the paper 90 sandwiched by the paired conveyance rollers. The paper thickness detector 522 measures the thickness of the paper 90 by measuring the height of this displaced axis.

(Surface Nature Detector 523)

The surface nature detector 523 includes a housing body, a light emitting unit, a collimating lens, and a plurality of light receiving units (optical sensor) and is configured to optically detects regular reflection limelight and diffuse reflection light from a surface of a paper as described hereinafter. With this, the surface nature detector 523 detects the characteristics of a coat layer of the paper 90. An opening portion (measurement region) is provided to a guide plate located above a paper-passing region of the conveyance path 241, and this opening portion serves as an irradiation region of the light receiving unit. Irradiation light emitted from the light emitting unit is made approximately parallel by a collimating lens and irradiated at an incident angle of 75 degrees relative to a reference surface. The wavelength of the irradiation light is, for example, 465 nm. The plurality of light receiving units receives regular reflection light and diffuse reflection light. For example, the plurality of light receiving units are disposed on three places of a position at 30 reflection angles (for diffuse reflection light), a position at 60 reflection degrees (for diffuse reflection light), and a position at 75 reflection degrees (for regular reflection light), or on two places of a place at 60 degrees and a place at 75 degrees. The surface nature detector 523 detects the surface nature of the paper 90 on the basis of the absolute value and ratio of the intensity of light received by each of the light receiving units.

(Basis Weight Detector 524)

A basis weight detector 524 is a sensor that detects the basis weight of a paper 90, includes a light emitting unit and a light receiving unit, and is configured to measure a basis weight on the basis of the amount of attenuation of light having transmitted through the paper 90. For example, in the basis weight sensor, the light emitting unit is arranged at a place lower than a conveyance region (paper conveyance path), the light receiving unit is arranged at an upper place, and the light receiving unit is configured to receive light having passed through the paper. With this configuration, the basis weight detector 524 detects the basis weight of the paper 90 on the basis of the intensity of the received light.

Figure 6:
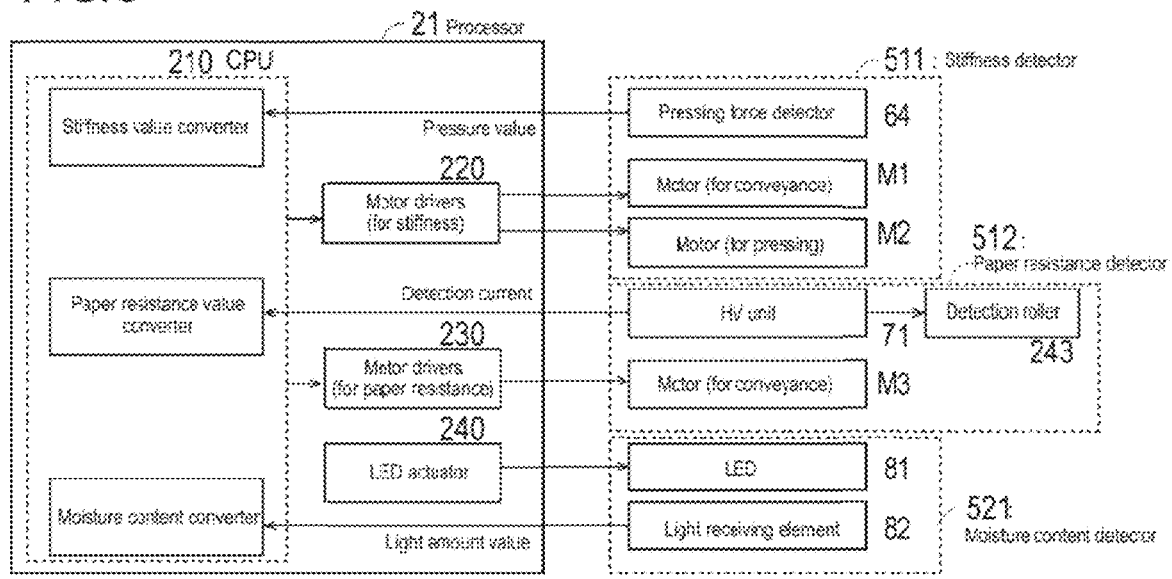
FIG. 6 is a block diagram for describing a flow of each signal between each detector and a processor.

FIG. 6 is a block diagram for describing a flow of a signal between each detector and a processor. In FIG. 6, the stiffness detector 511, the paper resistance detector 512, and the moisture content detector 521 are shown as a representative, and the description of other detectors such as the paper thickness detector 522 is omitted.

The CPU 210 of the processor 21 functions as a stiffness value converter, a paper resistance value converter, and a moisture content converter. Moreover, the processor 21 includes a control chip for motor drivers 220 and 230 and a LED actuator 240 and is configured to control an action of each of the above components. Then, the processor 21 acquires physical property values of a stiffness value, a paper resistance value, and a moisture content correspondingly to a pressure value, a detection current, and a light amount value of reflection light that are obtained from the respective detectors. For example, with regard to the stiffness detector 511, the motor driver 220 controls the driving (rotation, stop, an amount of rotation) of each of the motors M1 and M2 in accordance with control signals of the CPU 210, the pressing force detector 64 detects a pressing force and acquires a pressure value corresponding to the pressing force, and the stiffness value converter obtains a stiffness value by converting this pressure value. Moreover, the paper resistance value converter acquires a paper resistance by dividing a voltage applied by the HV unit 71 with a measured current value.

(Change of Physical Property Value Due to Difference in Position in Paper Bundle)

Figure 7:
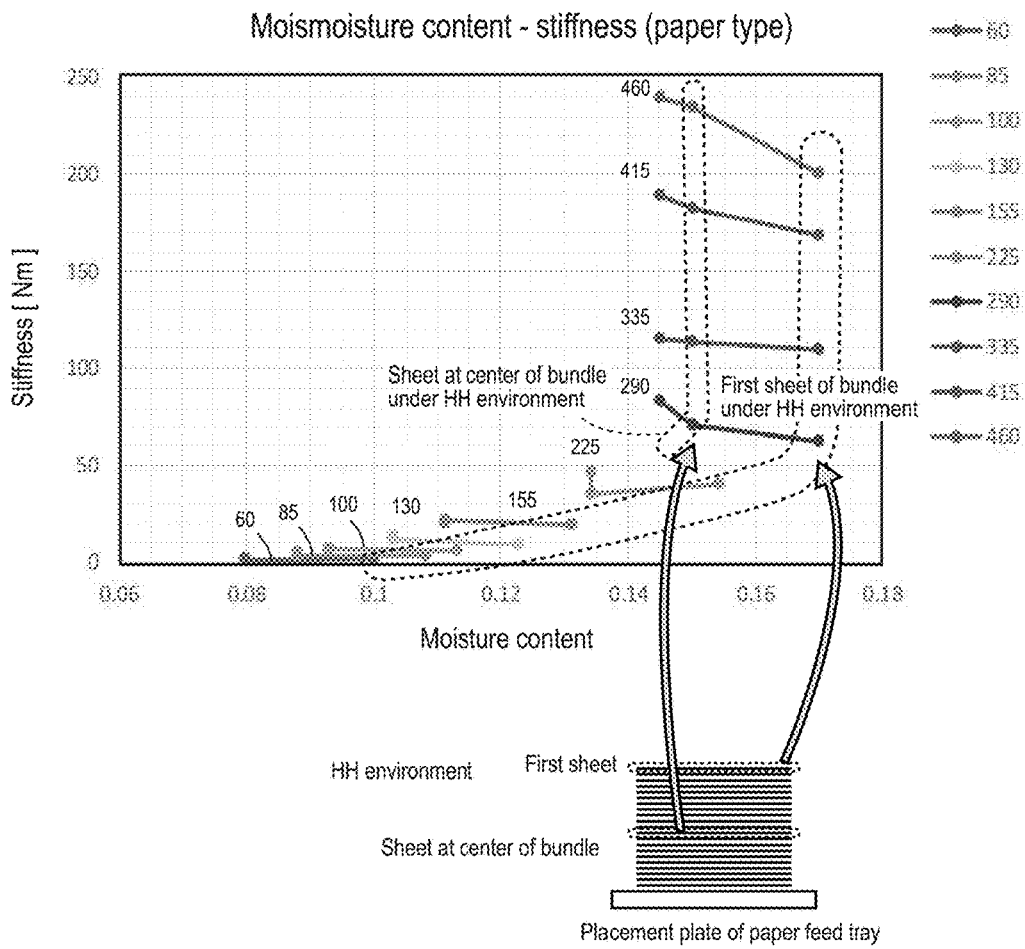
FIG. 7 is a schematic diagram for describing a change of each of moisture content and stiffness due to a difference in position in a paper bundle in a paper feed tray in an HH environment.
Figure 8:
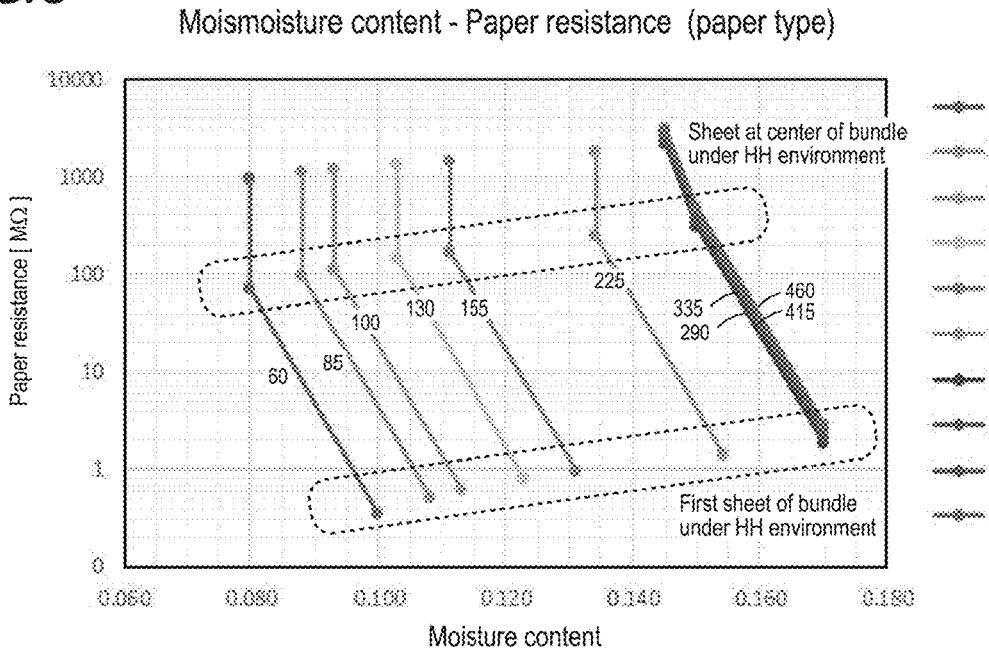
FIG. 8 is a schematic diagram for describing a change of each of moisture content and paper resistance due to a difference in position in a paper bundle in a paper feed tray in a HH environment.

Next, with reference to FIG. 7 and FIG. 8, description is given to a change of a physical property value due to a difference in position in a paper bundle, which is the subject matter of the present patent application. FIG. 7 is a schematic diagram for describing a change of a moisture content due to a difference in position in a paper bundle in a paper feed tray in an HH environment (which means 30° C. 80% RH, hereinafter, the same is applicable) and a stiffness at that time. In FIG. 7, an axis of abscissa represents a moisture content (mass %) of a paper, and an axis of ordinate represents a stiffness (N m). A bundle of the paper 90 placed in the paper feed tray 131 is prepared such that a package of the bundle of the paper 90 is opened and the bundle of the paper 90 is placed on a placement plate of the paper feed tray 131. At this time, since a paper (in FIG. 7, written as the first sheet) in an uppermost surface comes directly in contact with air of the environment, the paper adapts to the environment relatively in a short time. That is, in the HH environment, the paper in the uppermost surface is humidified immediately and the moisture content of the paper reaches a saturation value. On the other hand, since a paper at a center of the paper bundle is sandwiched between a paper positioned above its upper surface and a paper positioned below its lower surface, the paper needs longer time until the paper adapts to the environment and its moisture content reaches a saturation value. For example, in several days after having opened a paper package and loaded the paper bundle into the paper feed tray 131, in the paper bundle, from a paper in the uppermost surface of the paper bundle to a paper at the center of the paper bundle, the moisture content of each paper of the paper bundle becomes uneven.

In FIG. 7, numerals such as 60, 85, etc. in the legend represent a basis weight (g/m$^2$), and FIG. 7 is a graph showing a relationship between a moisture content and a stiffness for each paper of the paper bundle different in basis weight. In each data composed of two points or three points, a plot at the right side (moisture content is high) represents the moisture content and stiffness of the first sheet of a paper bundle under the HH environment as shown in the diagram, and a plot neighboring to the left of the above-mentioned plot represents the moisture content and stiffness of a paper at the center of the paper bundle. In this way, a paper shows a tendency in which the stiffness becomes higher as the moisture content becomes lower.

FIG. 8 is a schematic diagram for describing a change of a moisture content due to a difference in position in a paper bundle in a paper feed tray in an HH environment similar to that in FIG. 7 and a paper resistance (MΩ) at that time. In this way, a paper shows a tendency in which the paper resistance becomes higher as the moisture content becomes lower.

Figure 9:
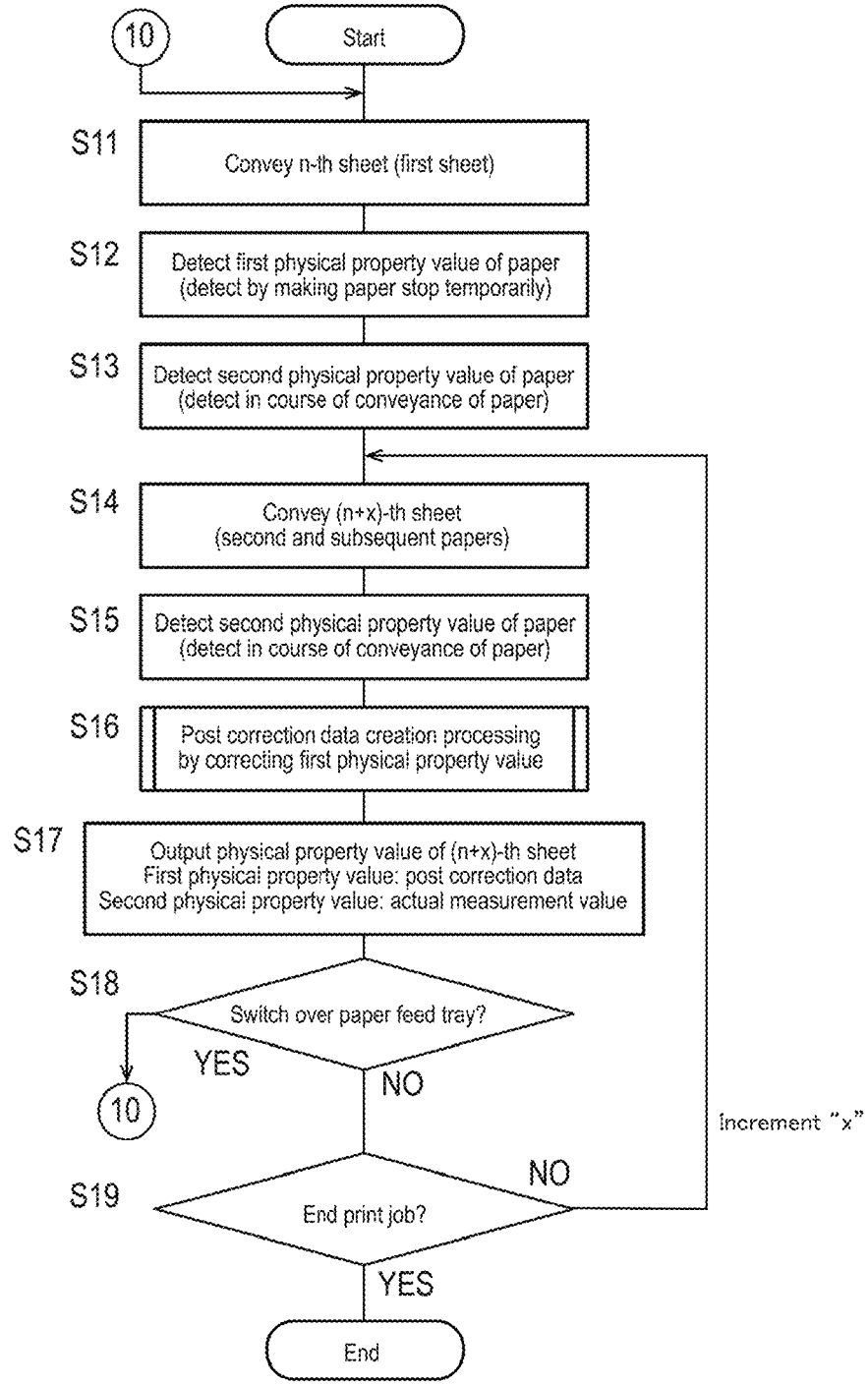
FIG. 9 is a flowchart showing paper physical property detection processing.

FIG. 9 is a flowchart showing paper physical property detection processing of the paper physical property detecting device 20, and FIG. 10 is a subroutine flowchart showing processing in Step S16 in FIG. 9. In the processing shown in FIG. 9, the paper physical property detecting device 20 detects and corrects the physical properties of a paper and outputs the corrected physical properties of the paper to the main body unit 30. The main body unit 30 forms images on a paper by using control parameters of image formation and the like set on the basis of the received paper physical properties.

(Paper of n-Th Sheet, Paper of (n+x)-Th Sheet)

In the paper physical property detection processing described below, the paper physical property detecting device detects the paper physical properties for a paper 90 of the n-th sheet with both the first and second physical property detectors 51 and 52. At this time, the first physical property detector 51 makes the paper 90 stop temporarily and performs measurement of the paper physical properties as mentioned above. Moreover, for the paper 90 of the (n+x)-th sheet (also referred to as "a paper of one or more subsequent sheets"), the paper physical property detecting device detects the paper physical properties with the second physical property detector 52 while conveying the paper 90 without making it stop temporarily.

As the paper 90 of the n-th sheet, there exist (a1) a paper that is conveyed immediately before starting a print job and used for detecting paper physical properties (in Step S11 at the first time in below-mentioned FIG. 9) or a paper of the first sheet used in a print job, (a2) the first paper of a new paper feed tray in the case of changing a paper feed tray due to setting of a print job or out of paper (automatic tray switch-over setting) (in below-mentioned Step S18), (a3) the first paper at the time of having newly supplied the paper 90 to the paper feed tray due to out of paper in the course of executing a print job, and (a4) a paper at the time of having counted up a predetermined count value (for example, a counter value is 100 sheets). In a1, "n" is the first sheet after starting a print job, in a2 and a3, "n" is the number of sheets in the middle of a print job, and in a4, "n" is the number of sheets with a predetermined interval, such as 1, 101, 201, . . . . (a case where the count value is 100).

Moreover, in the example of the former case (immediately before starting) of the above a1, a paper 90 of the first sheet that is fed out from the paper feed tray 131 so as to be conveyed immediately before starting of a print job for detecting paper physical properties, is discharged as a blank paper without forming an image (wastepaper). For example, in the case of the configuration where the first and second physical property detectors 51 and 52 are disposed on one conveyance path 241 as shown in FIG. 1, a paper 90 (blank paper) of the n-th sheet is discharged to the paper discharging tray 42 used as a sub tray, and the paper 90 (printing paper) of the (n+x)-th sheet is discharged to the paper discharging tray 41 used as a main tray. Moreover, in the case of the configuration where the first physical property detector 51 is located on the downstream side of the second physical property detector 52 and disposed on a conveyance path branched from the main conveyance paths 241, a paper 90 of the n-th sheet is discharged via the branched conveyance path. Moreover, in the example of the latter case ("a paper of the first sheet used in a print job") of the above a1, a paper 90 of the first sheet fed from the paper feed tray 131 is used for printing without being made a wastepaper.

The paper 90 of the (n+x)-th sheet is a paper other than the paper of the n-th sheet. For example, in the example of the above (a1), at the time of executing a print job of 500 sheets, in the case where the paper 90 of each of 500 sheets or more is stored in a certain paper feed tray, a paper of the first sheet is a paper of the n-th sheet, and a paper of one of the second to 500th sheets other than this is equivalent to a paper of the (n+x)-th sheet (herein, n is 1, and x is 1 to 499).

(Step S11)

The main body unit 30 starts a print job by receiving a print job. The paper feeding device 10 feeds the paper 90 from the paper feed tray 131 used in the print job and conveys the paper 90. The paper physical property detecting device 20 conveys the paper 90 received from the paper feeding device 10 to the conveyance path 241. The paper 90 of the first sheet is equivalent to the above-mentioned paper of the n-th sheet to be subjected to detection of paper physical properties in both the first and second physical property detector 51 and 52 by the following processing.

(Steps S12 and S13)

For the paper 90 of the n-th sheet that is fed from the paper feed tray 131 and conveyed on the conveyance path 241, the detection of paper physical properties is performed by both the physical property detectors 51 and 52, whereby the first and second physical property values are acquired. When the measurement is performed by this first physical property detector 51, the paper 90 is made to stop temporarily. The measurement results in here with regard to the first and second physical property values are temporarily memorized in the memory unit 22. Moreover, the paper 90 used for this paper physical property detection is not subjected to image formation in the image former 35 on the downstream side and may be discharged as wastepaper of a blank paper.

(Step S14)

The paper feeding device 10 feeds a paper 90 of each of the second and subsequent sheets from the same paper feed tray 131 and conveys the paper 90. The paper physical property detecting device 20 conveys the paper 90 received from the paper feeding device 10 to the conveyance path 241. The paper 90 of each of the second and subsequent sheets is equivalent to the above-mentioned paper of the (n+x)-th sheet.

(Step S15)

For the paper 90 of the (n+x)-th sheet being conveyed on the conveyance path 241, the detection of paper physical properties is performed only by the second physical property detector 52, whereby the second physical property values are acquired. When performing the measurement by this second physical property detector 52, the paper 90 is subjected to the measurement while being conveyed without being stopped temporarily. Accordingly, conveyance efficiency or productivity does not lower.

(Step S16)

The corrector 211 corrects the first physical property value on the basis of the second physical property value and creates post correction data. Here, one or both of the first and second physical property values may be the physical property values of multiple types. For example, the second physical property value is moisture content, the first physical property value is stiffness and paper resistance, and the post correction data of the two physical property values with regard to the stiffness and the paper resistance are created on the basis of the moisture content. The specific contents of this processing will be described with reference to FIG. 10.

(Step S611)

Herein, the corrector 211 selects a correction table on the basis of the first and second physical property values of the paper of the n-th sheet acquired by the processing in Steps S11 to S13. Since the memory unit 22 memorizes a plurality of correction tables beforehand, the corrector 211 selects the correction table from them.

FIGS. 11A and 11B are illustrations for describing a selected correction table and a change of each of the first and second physical property values. In the example shown in FIG. 11A, the first physical property is stiffness, and the second physical property is moisture content. The corrector 211 selects a correction table to be used on the basis of the first and second physical property values and their types of the paper of the n-th sheet (first sheet) memorized temporarily in the memory unit 22. FIG. 11A shows an example of a correction table that is selected and acquired from the memory unit 22 in the case of a combination in which the first physical property of the paper of the first sheet (n-th sheet) acquired in the processing of Steps S11 to S13 is stiffness whose value is 201 and the second physical property is moisture content whose value is 0.17.

(Step S612)

Next, the corrector 211 creates the post correction first physical property value on the basis of the second physical property value of the paper of the (n+x)-th sheet acquired in Step S15 so as to correspond to the physical property value of the second physical property value. As shown in FIGS. 11A and 11B, in the case where the second physical property value of the (n+x1)-th sheet is detected as being, for example, 0.146%, the post correction first physical property value (stiffness) of the (n+x1)-th sheet becomes 235 (Nm). That is, 201 of the first physical property value becomes 235 by being corrected. Moreover, in the case where the second physical property value of the (n+x2)-th sheet is detected as being, for example, 0.145% or less, the post correction first physical property value of the (n+x2)-th sheet becomes similarly 240 (Nm). Here, the (n+x2)-th sheet is a paper near the center of the paper bundle, and the (n+x1)-th sheet is a paper at middle between the first sheet and the (n+x2)-th sheet.

FIG. 12 shows an example of another correction table selected on the basis of the first and second physical property values of the n-th sheet (first sheet). Although the types of the first and second physical properties are the same as in FIG. 11A, FIG. 12 shows an example in the case of using a paper different in basis weight. Similarly, the corrector 211 selects a correction table as shown in FIG. 12 correspondingly to the first and second physical property values and type of the n-th sheet (first sheet) that is obtained by the processing in Steps S11 to S13 and memorized temporarily in the memory unit 22. Then, the corrector 211 corrects the first physical property value (stiffness) to 182 or 189 correspondingly to the second physical property value (moisture content) acquired in Step S15.

FIG. 13 and FIG. 14 show an example in the case where the first physical property and the second physical property are paper resistance and moisture content, respectively. In this connection, in each of FIG. 11A and FIG. 13, a paper of the same basis weight is used, and in each of FIG. 12 and FIG. 14, a paper of the same basis weight is used.

By performing the post correction data creation processing as described above, the processing shown in FIG. 10 is ended, and the processing returns to processing shown in FIG. 9 (End (Return)).

(Step S17)

The output unit (communication unit 29) outputs the first and second physical property values of the (n+x)-th sheet to the main body unit 30. This second physical property value is an actual measurement value acquired in Step S15, and this first physical property value is the post correction data created in Step S16 by using this second physical property value. In this connection, in here, the output unit may be made so as to output only the first physical property value (post correction data) of the (n+x)-th sheet.

(Image Formation Processing in Main Body Unit 30)

The main body unit 30 sets control parameters with regard to fixing, transfer, and conveyance for a paper 90 of the (n+x)-th sheet on the basis of the physical property values of the paper sent in here or the physical property values of the paper input by a user on the operation panel 36 together with this, forms an image on the paper 90 by the image former 35, and outputs the paper 90. Moreover, in the case of switching over a paper feed tray on the basis of the job setting of a print job, or in the case of switching over to other paper feed tray 131 due to out of sheets (depletion) by consumption, the processor 31 of the main body unit 30 transmits a switchover instruction signal of the paper feed tray 131 to the paper feeding device 10 and the paper physical property detecting device 20. Moreover, in the case of ending a print job, the processor 31 transmits an end instruction signal to the paper feeding device 10 and the paper physical property detecting device 20.

(Step S18)

In the case of receiving the switch-over instruction of a paper feed tray and performing switching over the paper feed tray 131 (YES), the processor 31 returns the processing to Step S11. Here, the paper of the first sheet after having switched over the paper feed tray is equivalent to the paper of the n-th sheet, and in Steps S11 to S13, the detection of the first and second physical property values is performed by the first and second physical property detectors 51 and 52. On the other hand, in the case where the switching over of the paper feed tray 131 is not performed (NO), the processor 31 advances the processing to Step S19.

(Step S19)

In the case where the print job is not ended (NO), the processor 31 returns the processing to Step S14 and repeats the subsequent processing. In this case, "x" is incremented. On the other hand, in the case where the print job has been ended (YES), processing is ended (End).

In this way, the paper physical property detecting device 20 according to the present embodiment includes the first detector that measures a paper made to stop temporarily and acquires the first physical property value (the first value corresponding to the first physical property); the second detector that measures a paper while conveying the paper and acquires the second physical property value (the second value corresponding to the second physical property) with regard to a paper physical property different from the first physical property value; and a corrector that corrects the first physical property value on a basis of the second physical property value and creates post correction data. With such configuration, the detection of paper physical properties is performed with high precision, and in addition, the lowering of productivity can be suppressed.

In particular, in the present embodiment, with regard to a paper of the n-th sheet (n is a positive integer) fed from the paper feeding tray, the paper is made to stop temporarily, and the first and second physical property values are acquired from the paper by the first and second detectors. With regard to a paper of the (n+x)-th sheet (x is a positive integer), the paper is not made to stop temporarily, and the second physical property value is acquired from the paper by the second detector. Successively, the corrector corrects the first physical property value of the paper of the n-th sheet on the basis of the second physical property value of the paper of the (n+x)-th (x is a positive integer), creates post correction data, and outputs the post correction data. With this, with regard to the paper of the first sheet (the n-th sheet), at the time of detecting paper physical properties, a temporary stop is accompanied. However, with regard to a paper of each of the second and subsequent sheets (the (n+x)-th sheets), only the detection of the second physical property value is performed while conveying the paper without making the paper stop temporarily, and with regard to the first physical property value, post correction data is created. With such configuration, the detection of the paper physical properties is performed with high precision. In addition, the lowering of paper conveyance or productivity at the time of forming images in the latter stage, can be suppressed.

First and Second Modified Examples

Next, with reference to FIG. 15 to FIG. 17, the creation processing of post correction data in the first and second modified examples is described. In the first and second modified examples, the post correction data is created by a relational expression in place of the correction table.

FIG. 15 is a subroutine flowchart showing the processing in Step S16 in the first modified example, and FIG. 16 is a diagram for describing a relational expression (also called a correction formula) and a change of each of the first and second physical property values.

(Step S621)

Here, the corrector 211 selects a relational expression of a linear function on the basis of the first and second physical property values of a paper of the n-th sheet acquired by the processing in Steps S11 to S13. The memory unit 22 memorizes in advance the coefficients of a function corresponding to each of the combinations of the types of physical properties of the first and second physical property values, and the corrector 211 calculates a cut piece or a constant from the first and second physical property values of the paper of the n-th sheet. For example, in the example in FIG. 16, the corrector 211 decides a coefficient as −1603.2 from a combination of the physical properties of the first and second physical property values of the paper of the first sheet, acquires a cut piece (473.6) from the first and second physical property values, and decides a relational expression (y=−1603.2x+473.6). In this connection, in the case where the types of physical properties of the first and second physical property values are paper resistance and moisture content, a function becomes a polynomial, and a constant is calculated from the first and second physical property values of the n-th sheet.

(Step S622)

Figures 16A, 16B:
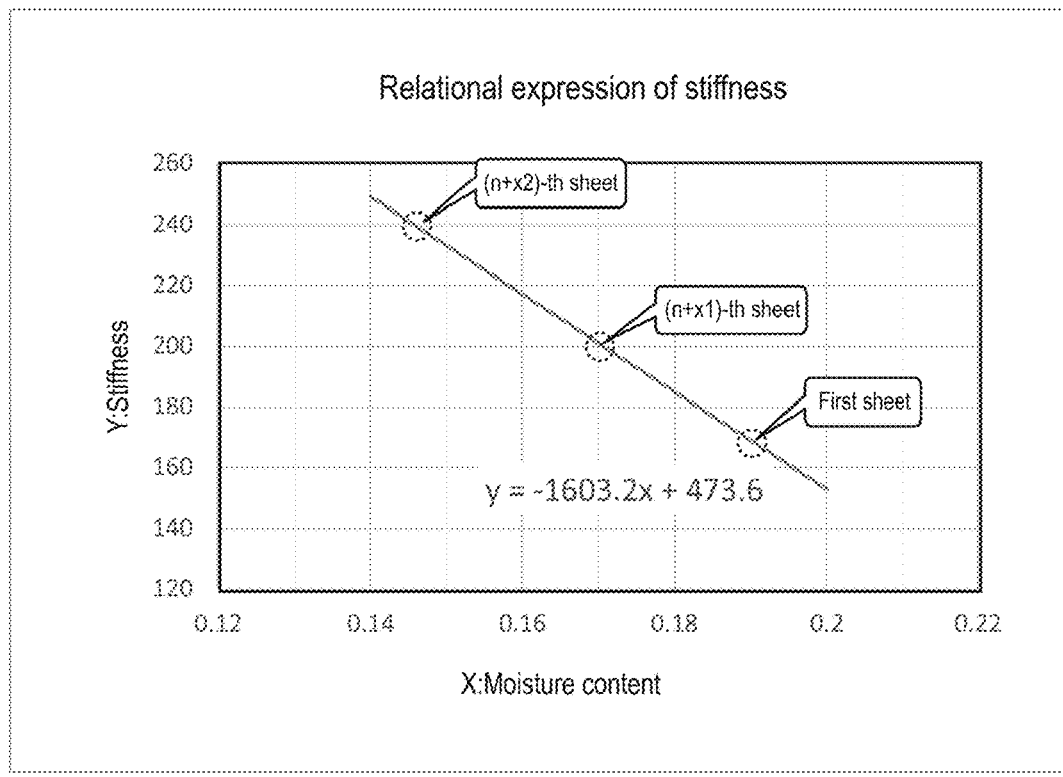
FIGS. 16A and 16B are diagrams for describing a relational expression in the first modified example and a change of each of the first and second physical property values.

Next, the corrector 211 creates the post correction first physical property value on the basis of the second physical property value of the paper of the (n+x)-th sheet acquired in Step S15 so as correspond to the physical property value of the second physical property value. As shown in FIGS. 16A and 16B, in the case where the second physical property value of the paper of the (n+x1)-th sheet is detected as, for example, 0.17%, the post correction first physical property value (stiffness) of the paper of the (n+x1)-th sheet becomes 201 (Nm). Moreover, in the case where the second physical property value of the paper of the (n+x2)-th sheet is detected as 0.145%, the post correction first physical property value of the paper of the (n+x2)-th sheet similarly becomes 241 (Nm). As described above, by performing the post correction data creation processing, the processing in FIG. 15 is ended, and the processing returns to the processing in FIG. 9 (End (Return)).

Figures 17A, 17B:
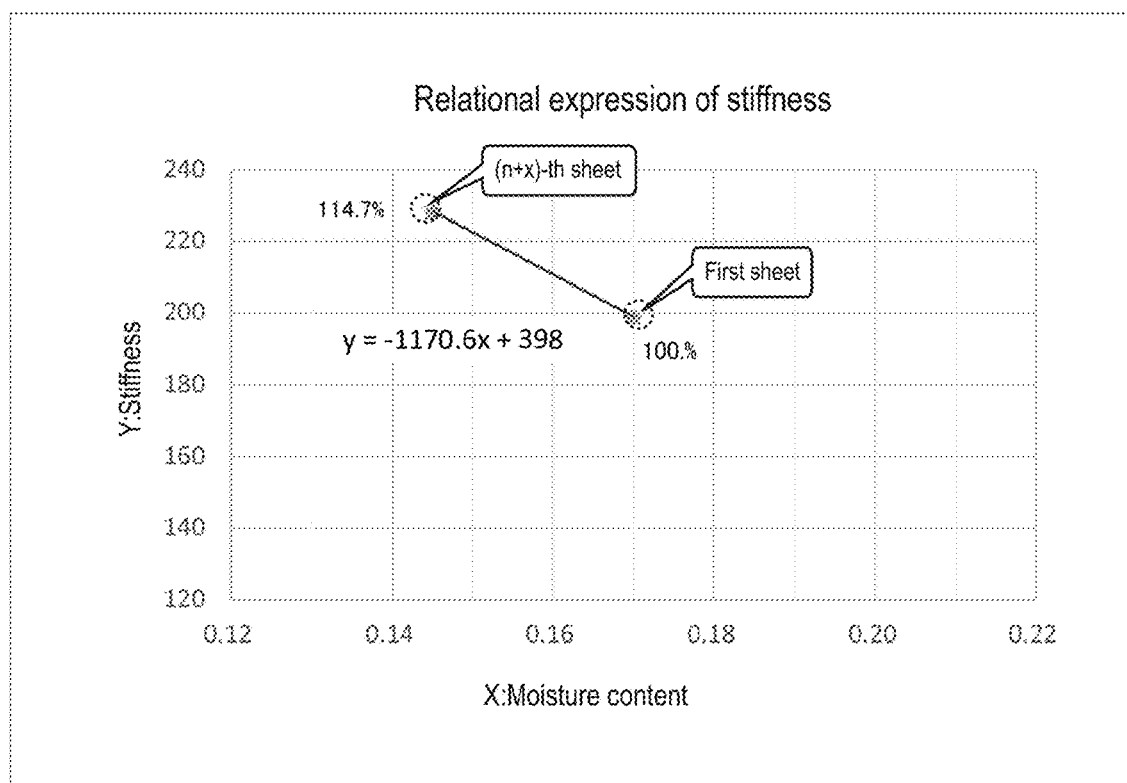
FIGS. 17A and 17B are diagrams for describing an example of another relational expression in the second modified example.

FIGS. 17A and 17B are diagrams for describing an example of another relational expression in the second modified example. In the second modified example, a proportional expression is used. This proportional expression is decided on the basis of the types and values of the first and second physical property values of the paper of the n-th sheet acquired by the processing in Steps S11 to S13. In the case where the types of the first and second physical properties are stiffness and moisture content, this proportional expression can be applied. For example, in the case where the types of the acquired first and second physical property values are stiffness and moisture content and the respective values of them are "199" and "0.17", and in the case where the second physical property value of the paper of the (n+x)-th sheet is 0.145, a rate of change of the second physical property value relative to the standard (0.17 (the second physical property value of the n-th sheet)) becomes −14.7%. In the case where the type is the stiffness, in order to correct the rate of change of −14.7% to minus, the post correction data of the first physical property value becomes 199×114.7% (+14.7%)=228.3. In the relational expression, this proportional expression is equivalent to 1170.6x+398, as shown in FIG. 17B.

As indicated in the first and second modified example, even in the case where the post correction data of the first physical property value is acquired by using the relational expression, the same effect as the embodiment shown in above-mentioned FIG. 1 to FIG. 14 can be acquired. In particular, at the time of acquiring post correction data of the first physical property values, the first modified example that uses coefficients acquired beforehand is more preferable in terms of accuracy. However, like the second modified example, by acquiring with relative comparison, it may be permissible to acquire coefficients beforehand, and it becomes possible to acquire post correction data easily even in the case of using unknown paper.

In the configuration of the above-described paper physical property detecting device 20 and the image forming apparatus 1000 including this device 20, the main configuration is described in order to describe the features of the above-described embodiment. Accordingly, without being limited to the above-described configuration, the configuration may be modified variously within the scope of claims. Moreover, it is not intended to eliminate the configuration equipped in a general image forming apparatus.

In each of the above-described embodiments, description has been given to an example where the moisture content is used as the second physical property value and where the first physical property value (stiffness and paper resistance)

is corrected on the basis of the moisture content detected in the paper of the (n+x)-th sheet. However, without being limited to this, as the second physical property value, one of paper thickness, surface nature, and basis weight may be used.

Moreover, devices and methods to perform various types of processing in the paper physical property detecting device 20 and the main body unit 30 according to the embodiments mentioned above can be realized by any one of a hardware circuit for exclusive use and a programmed computer. The above-described program, for example, may be provided by a computer-readable recording medium, such as a USB memory and DVD (Digital Versatile Disc)-ROM, or may be provided on-line through a network, such as internet. In this case, the program recorded in a computer-readable recording medium is usually transmitted to and memorized in a memory unit, such as a hard disk. Moreover, the above-mentioned program may be provided as independent application software or may be incorporated in the software of an apparatus as one function of the apparatus.

Although embodiments of the present invention have been described and illustrated in detail, the disclosed embodiments are made for purpose of illustration and example only and not limitation. The scope of the present invention should be interpreted by terms of the appended claims

What is claimed is:

1. A paper physical property detecting device, comprising:
    a conveyance path on which a sheet of paper (hereinafter, merely referred to as a paper) fed from a paper feed tray is conveyed;
    a first detector that measures a paper made to stop temporarily on the conveyance path and acquires a first value corresponding to a first physical property;
    a second detector that measures a paper while conveying the paper on the conveyance path and acquires a second value corresponding to a second physical property with regard to a physical property different from the first physical property; and
    a corrector that corrects the first value on a basis of the second value and creates post correction data.

2. The paper physical property detecting device according to claim 1, wherein the second detector acquires the second value for the paper made to stop temporarily and for a paper of each of one or more subsequent sheets, and the corrector creates post correction data for the paper of each of the subsequent sheets on a basis of the second value of the paper of each of the subsequent sheets.

3. The paper physical property detecting device according to claim 2, further comprising:
    an output unit that outputs the post correction data,
    wherein for a paper of n-th sheet ("n" is a positive integer) fed from the paper feed tray, the first and second physical property values are acquired by the first and second detectors by making the paper stop temporarily,
    for a paper of (n+x)-th sheet ("x" is a positive integer), the second value corresponding to the second physical property is acquired by the second detector without making the paper stop temporarily,
    the corrector creates post correction data by correcting the first value of the paper of the n-th sheet on a basis of the second value of the paper of the (n+x)-th sheet ("x" is a positive integer), and
    the output unit outputs the post correction data as the first value of the paper of the (n+x)-th sheet.

4. The paper physical property detecting device according to claim 3, wherein on a downstream side of the conveyance path, there is provided an image former that forms an image on a paper on a basis of a print job, and
    the output unit outputs post correction data created by the corrector as the first value of the paper of the (n+x)-th sheet to be used for setting control parameters in the image former.

5. The paper physical property detecting device according to claim 3, wherein the output unit further outputs the second physical property value of the paper of the (n+x)-th sheet acquired by the second detector.

6. The paper physical property detecting device according to claim 3, wherein the paper of the n-th sheet is a paper that is conveyed immediately before starting a print job and is used for detecting paper physical properties or a paper of the first sheet to be used in a print job.

7. The paper physical property detecting device according to claim 3, wherein the paper feed tray includes a plurality of paper feed trays, and
    in a case of switching over a paper feed tray to be used in middle of a print job, the paper of the n-th sheet is a paper to be fed firstly from the switched-over paper feed tray.

8. The paper physical property detecting device according to claim 1, wherein the first value is a value with regard to stiffness and/or electric resistance being the first physical property of a paper.

9. The paper physical property detecting device according to claim 1, wherein the second value is a value with regard to moisture amount being the second physical property of a paper.

10. The paper physical property detecting device according to claim 9, wherein the second detector includes an optical sensor and acquires a physical property value with regard to a moisture amount of the paper by the optical sensor.

11. The paper physical property detecting device according to claim 1, wherein the corrector creates the post correction data on a basis of a correction table or a relational expression that is memorized in a memory unit and indicates a correspondence relation between the first value and the second value.

12. The paper physical property detecting device according to claim 1, wherein the second value includes a value corresponding to at least one of basis weight of a paper, thickness of a paper, and surface nature of a paper detected by an optical sensor, which are the second physical property of the paper.

13. An image forming apparatus, comprising:
    an image former that is disposed on a downstream side of a conveyance path and forms an image on a conveyed paper, and
    the paper physical property detecting device according to claim 1,
    wherein the image former sets an image forming condition on a basis of the post correction data output from the paper physical property detecting device and forms an image on the paper of the (n+x)-th sheet with the image forming condition.

14. A paper physical property detecting method to be executed in a paper physical property detecting device that includes a conveyance path on which a sheet of paper (hereinafter, merely referred to as a paper) fed from a paper feed tray is conveyed, a first detector that measures a paper made to stop temporarily on the conveyance path and acquires a first value corresponding to a first physical property, and a second detector that measures a paper while conveying the paper on the conveyance path and acquires a second value corresponding to a second physical property with regard to a physical property different from the first physical property, the method comprising:
- (a) acquiring the second value by the second detector for a paper conveyed on the conveyance path; and
- (b) creating post correction data by correcting the first value on a basis of the second value.

15. The paper physical property detecting method according to claim 14, wherein in the (a), acquiring the second value for the paper made to stop temporarily and for a paper of each of one or more subsequent sheets by the second detector, and
in the (b), creating post data for the paper of each of the subsequent sheets on a basis of the second value of the paper of each of the subsequent sheets.

16. The paper physical property detecting method according to claim 15, further comprising:
- (c) acquiring a first value corresponding to a first physical property for a paper of n-th sheet ("n" is a positive integer) by making the paper stop temporarily by the first detector and acquiring a second value corresponding to a second physical property by the second detector while conveying the paper, wherein the (c) is executed before the (a),
in the (a), for a paper of (n+x)-th sheet ("x" is a positive integer) fed from the paper feed tray, acquiring the second value by the second detector without making the paper stop temporarily on the conveyance path,
in the (b), creating post correction data by correcting the first value of the paper of the n-th sheet acquired in the (c) on a basis of the second value acquired in the (a), and further comprising:
- (d) outputting the post correction data acquired in the (b) as the first value of the paper of the (n+x)-th sheet.

17. The paper physical property detecting method according to claim 16, wherein on a downstream side of the conveyance path, there is provided an image former that forms an image on a paper on a basis of a print job, and
in the (d), outputting post correction data corrected in the (b) as the first value of the paper of the (n+x)-th sheet to be used for setting control parameters in the image former.

18. The paper physical property detecting method according to claim 16, wherein in the (d), further outputting the second value of the paper of the (n+x)-th sheet acquired in the (b).

19. The paper physical property detecting method according to claim 16, wherein the paper of the n-th sheet is a paper that is conveyed immediately before starting a print job and used for detection of paper physical properties, or a paper of the first sheet to be used in a print job.

20. The paper physical property detecting method according to claim 16, wherein the paper feed tray includes a plurality of paper feed trays, and
in a case of switching over a paper feed tray in middle of a print job, the paper of the n-th sheet is a paper to be fed firstly from the switched-over paper feed tray.

21. The paper physical property detecting method according to claim 14, wherein the first value is a value with regard to stiffness and/or electric resistance of a paper, which are the first physical property.

22. The paper physical property detecting method according to claim 14, wherein the second value is a value with regard to moisture amount of a paper, which is the second physical property.

23. The paper physical property detecting method according to claim 14, wherein in the (b), creating the post correction data on a basis of a correction table that is memorized in a memory unit and shows correspondence relation or a relational expression, between the first value and the second value.

24. A computer readable recording medium storing a control program that makes a computer that controls a paper physical property detecting device, execute the paper physical property detecting method according to claim 14.

* * * * *